Nov. 7, 1967     J. B. LEE HOLLINGSWORTH     3,351,695
METHOD OF AND APPARATUS FOR EXTRUDING THERMOPLASTIC MATERIAL
Filed Oct. 5, 1964
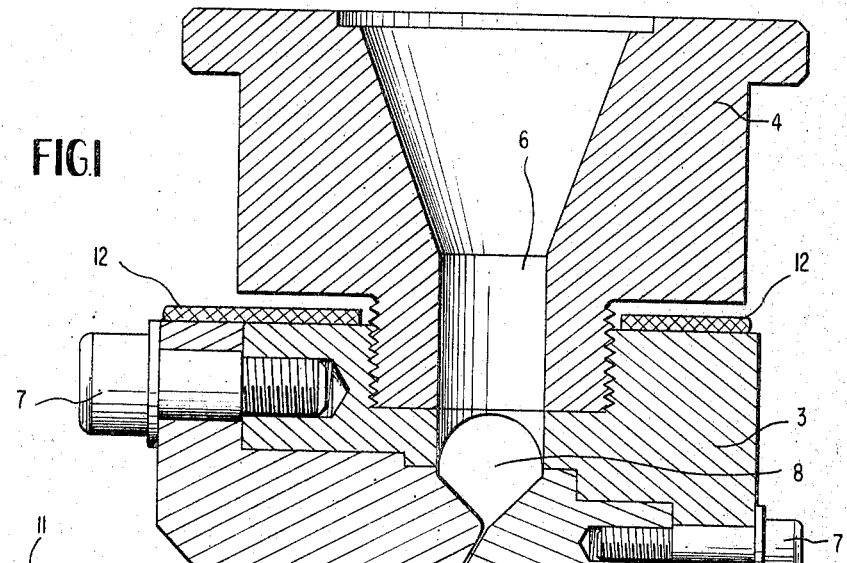
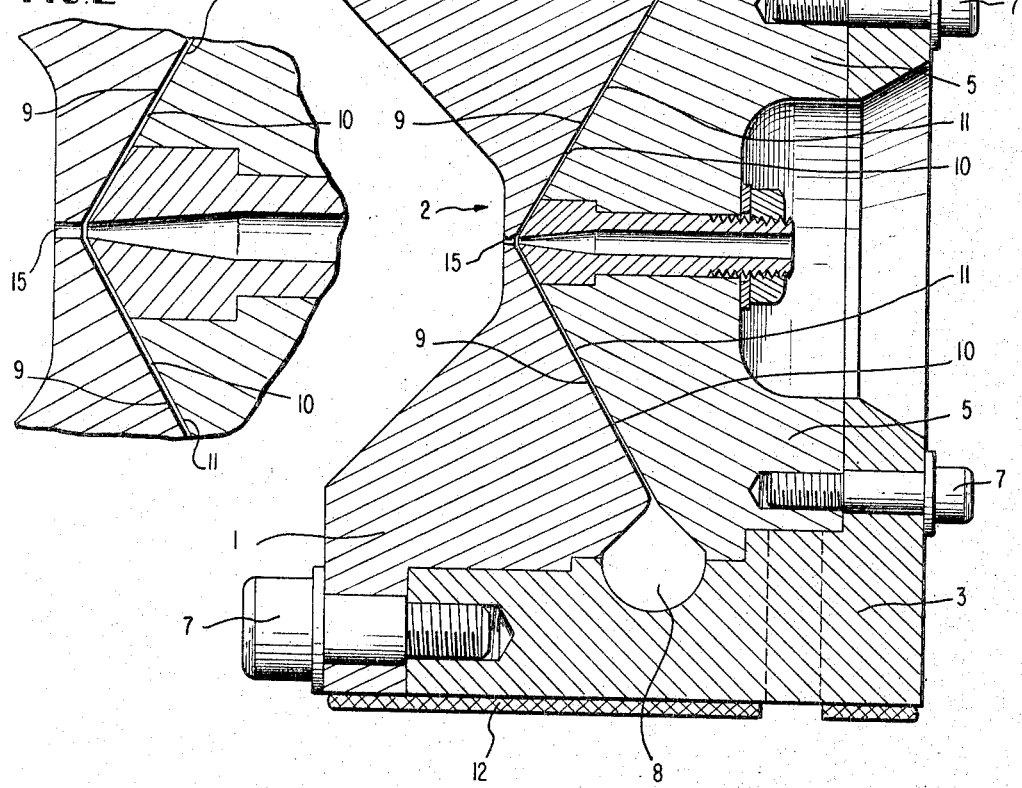
INVENTOR.
J. B. LEE HOLLINGSWORTH
BY
*James C. Arrantes*
ATTORNEY United States Patent Office 3,351,695
Patented Nov. 7, 1967

3,351,695
METHOD OF AND APPARATUS FOR EXTRUDING THERMOPLASTIC MATERIAL
J. B. Lee Hollingsworth, Bound Brook, N.J., assignor to Union Carbide Corporation, a corporation of New York
Filed Oct. 5, 1964, Ser. No. 401,337
6 Claims. (Cl. 264—176)

This invention relates to the extrusion of thermoplastic material. More specifically, this invention relates to a method of and apparatus for the extrusion of thermoplastic material to form shaped articles which are free of undesirable melt fracture, fish scaling and other such undesirable characteristics which are normally attributed to die entrance, surging phenomena.

Die entrance, surging phenomena, manifested in extruded products by such characteristics as melt fracture and fish scaling, is a term which is commonly used to define the irregular flow of thermoplastic material in an extrusion die. Irregular flow is accentuated whenever the rate of extrusion is increased which in turn results in more severe melt fracture and fish scaling in the extruded product.

Melt fracture is manifested, in the extruded product, by visible irregularities and fissures at the surface and in the body thereof. Fish scaling is a descriptive term which is used to define the visible surface characteristics of the extruded product.

As a result of the problems occasioned by die entrance, surging phenomena, a rather large number of thermoplastics such as polyethylene, polyvinyl chloride and the like have been found to be unsatisfactory for use in high speed extrusion operations. Previous attempts to eliminate or to substantially minimize the effects of die entrance, surging phenomena, with respect to thermoplastics previously named as well as to thermoplastics in general, have been directed, primarily, to a modification of the thermoplastic which is to be extruded. As an illustration, properties of thermoplastics such as density, molecular weight distribution and melt index have been altered in an attempt to eliminate or to substantially minimize die surging, entrance phenomena.

The present invention provides a method of and an apparatus for the production of extruded thermoplastic articles which are free of undesirable melt fracture, fish scaling and the like. In addition, the present invention provides for the extrusion of thermoplastic material, in general, without the necessity of modifying the properties thereof, to form extruded products which are free of the undesirable characteristics previously described. Furthermore, the present invention makes it possible to successfully extrude thermoplastics, which previously could not be extruded at a practical rate without development in the extruded product of undesirable melt fracture and fish scaling. Also, as another advantage of the present invention, it eliminates undesirable swelling of the extrudate.

Further advantages of the present invention are apparent from the following description taken in conjunction with the accompanying drawing wherein there is shown in FIGURE 1 a cross-sectional view, in elevation, of one embodiment of the apparatus, i.e., the extrusion die, of this invention and in FIGURE 2 an enlarged fragmentary view of the die orifice and parallel passageway of the extrusion die of FIGURE 1.

Referring now to the accompanying drawing, the extrusion die 2 comprises three main functional sections, those being a die head 1, a die body 3 and a die insert 5, which are secured, one to another, by any suitable means, as for example, bolt assemblies 7.

Extrusion die 2 is mounted over an extruder (not shown) and receives thermoplastic material therefrom through means of an adapter 4 which is secured to extrusion die 2 through die body 3.

Adapter 4 has a passageway 6 through which thermoplastic material passes on being received from the extruder (not shown). Passageway 6 of adapter 4 is in communication with distributor channel 8 which is defined between the walls of die head 1, die body 3 and die insert 5. Distributor channel 8, in turn, is in communication with parallel passageway 10 which is defined between interior parallel walls 9 and 11 of die head 1 and die insert 5, respectively.

In the embodiment of the drawing, the distributor channel, identified by numeral 8, is shown as being defined by the walls of die head 1, die body 3 and die insert 5. Actually, the distributor channel can be any passageway through which thermoplastic material is supplied to the entrance of the parallel passageway, identified by numeral 10 in the drawing, which in turn is in communication with the die orifice of the extrusion die, identified by numeral 15 in the drawing. In order to insure a constant and sufficient flow of thermoplastic material to passageway 10, the cross-sectional area, transverse to flow, of distributor channel 8 is greater than the cross-sectional area, transverse to flow, of passageway 10.

In the accompanying drawing, die insert 5 is shown to have a conical configuration with the interior wall thereof 11 converging toward die orifice 15 and being parallel to interior wall 9 of die head 1. Rather than being straight and converging, as shown, the interior wall of die insert 5 can be of any other configuration, as for example, curved. In that event, the interior wall of die body 1 will be of a configuration such that the passageway defined between the two and leading into the die orifice is parallel.

The exact configuration of the interior walls of die body 1 and die insert 5 are not critical, provided that they are parallel defining a parallel passageway, identified by numeral 10 in the accompanying drawing, whose cross-sectional area transverse to flow of the thermoplastic material, progressively decreases to the die orifice, which is identified by numeral 15 in the accompanying drawing.

Die orifice 15, which is in communication with passageway 10, can be of any configuration, provided that its cross-sectional area, transverse to flow of the thermoplastic material is constant and equal to the cross-sectional area, transverse to flow, of passageway 10 at a point immediately prior to die orifice 15.

With the arrangement, as described, the linear velocity of the thermoplastic material progressively increases in passageway 10 to die orifice 15, and in die orifice 15, the linear velocity of the thermoplastic material is equal to the linear velocity of the thermoplastic material in passageway 10 at a point immediately prior to die orifice 15.

The temperature of the thermoplastic material which is being extruded is conveniently determined by positioning thermocouples (not shown) in the stream of flowing thermoplastic material, generally just prior to distributor channel 10. The temperature of the thermoplastic material which is being extruded is conveniently maintained at the desired level by band heater 12 which circumscribes extrusion die 2.

The method and apparatus of this invention can be utilized to produce solid as well as hollow articles from such thermoplastic materials as polyethylene, polyvinyl chloride, polystyrene, copolymers of vinyl chloride and vinyl acetate, copolymers of ethylene and ethyl acrylate and the like.

Also, die insert 5 can have an opening for the passage of an electrical conductor, such as copper wire, upon which is extruded thermoplastic jacketing material. Die insert 5 can also be provided with an opening which allows for the passage of a gas, such as air, which is utilized to expand thermoplastic material, passing through the die, to tubular film.

The following examples further illustrate the present invention and are not intended to limit the scope thereof in any manner.

*Example 1*

Utilizing an extrusion die of the type shown in the accompanying drawing, polyethylene, having a melt index of 0.1, was continuously extruded into the shape of a solid rod under the following conditions.

Extrusion temperature of thermoplastic ___° C__ 250
Extrusion rate _____cc. per sec__ 0.12
Die orifice:
    Diameter _____inch__ 0.0825
    Length _____do____ 0.26
Spacing of parallel passageway _____do____ 0.0825
Extrusion pressure _____p.s.i__ 600

The cross-sectional area of the die orifice, transverse to flow, was constant and equal to the cross-sectional area, transverse to flow, of the parallel passageway at a point immediately prior to the die orifice.

The extrudate was free of undesirable melt fracture and fish-scaling. The extrudate was also free of swelling.

In order to show the criticality of the present invention, die insert 5 was positioned such that the cross-sectional area, transverse to flow, of die orifice 15 was not equal to the cross-sectional area, transverse to flow, of passageway 10 at a point immediately prior to die orifice 15. A continuous, solid polyethylene rod was then extruded under the conditions noted above. The extrudate was characterized by severe melt fracture and fish scaling. The extrudate was also characterized by considerable swelling.

*Example 2*

This example was conducted using the extrusion die of Example 1 and also under the conditions described in Example 1, with the exception that the extrusion rates and extrusion pressures were varied.

| Extrusion Rate | Pressure | Characteristics of Extrudate |
|---|---|---|
| 0.22 cc. per second | 820 p.s.i | No noticeable melt fracture, fish scaling or swelling. |
| 0.35 cc. per second | 1,000 p.s.i | Do. |
| 0.55 cc. per second | 1,050 p.s.i | Do. |
| 0.82 cc. per second | 1,100 p.s.i | Do. |

In order to show the criticality of the present invention, die insert 5 was positioned such that the cross-sectional area, transverse to flow, of the die orifice 15 was not equal to the cross-sectional area, transverse to flow, of passageway 10 at a point immediately prior to die orifice 15. A continuous, solid polyethylene rod was then extruded under the conditions noted above, with the exception of the extrusion pressures.

| Extrusion Rate | Pressure | Characteristics of Extrudate |
|---|---|---|
| 0.22 cc. per second | 600 p.s.i | Severe melt fracture and fish scaling. |
| 0.35 cc. per second | 680 p.s.i | Do. |
| 0.55 cc. per second | 820 p.s.i | Do. |
| 0.82 cc. per second | 920 p.s.i | Do. |

In order to further demonstrate the necessity of maintaining the walls of the extrusion die parallel, as described, an experiment was conducted in a manner as described in Example 1 and using the same extrusion die as described in Example 1, with the exception that the walls did not define a parallel passageway. The extrudate was characterized by severe melt fracture and fish scaling.

What is claimed is:
1. An extrusion die into which thermoplastic material is received and from which said thermoplastic material is discharged, said extrusion die having, in communication, a parallel passageway and a die orifice, the cross-sectional area of said passageway, transverse to flow of said thermoplastic material, progressively decreasing to said die orifice and the cross-sectional area of said die orifice, transverse to flow of said thermoplastic material, being constant and being equal to the cross-sectional area, transverse to flow, of said passageway at a point immediately prior to said die orifice.

2. An extrusion die into which thermoplastic material is received and from which said thermoplastic material is discharged, said extrusion die having, in communication, a parallel passageway and a die orifice, said parallel passageway converging to said die orifice, the cross-sectional area of said passageway, transverse to flow of said thermoplastic material, progressively decreasing to said die orifice and the cross-sectional area of said die orifice, transverse to flow of said thermoplastic material, being constant and being equal to the cross-sectional area, transverse to flow, of said passageway at a point immediately prior to said die orifice.

3. An extrusion die into which thermoplastic material is received and from which said thermoplastic material is discharged, said extrusion die having in sequential communication, a distributor channel, a parallel passageway and a die orifice, the cross-sectional area of said passageway, transverse to flow of said thermoplastic material, being less than the cross-sectional area, transverse to flow, of said distributor channel and progressively decreasing to said die orifice and the cross-sectional area of said die orifice, transverse to flow of said thermoplastic material, being constant and being equal to the cross-sectional area, transverse to flow, of said passageway at a point immediately prior to said die orifice.

4. An extrusion die into which thermoplastic material is received and from which said thermoplastic material is discharged, said extrusion die comprising a die body, a die insert and die head defining a distributor channel which receives thermoplastic material and from which the thermoplastic material passes into a parallel passageway defined by the interior walls of said die body and die insert, said parallel passageway being in communication with the die orifice defined by said die body, the cross-sectional area of said passageway, transverse to flow of said thermoplastic material, progressively decreasing to said die orifice and the cross-sectional area of said die orifice, transverse to flow of said thermoplastic material, being constant and being equal to the cross-sectional area, transverse to flow, of said passageway at a point immediately prior to said die orifice.

5. A method of extruding thermoplastic which comprises progressively increasing the linear velocity of said thermoplastic material as it passes through a parallel passageway to a die orifice and in said die orifice maintaining the linear velocity of said thermoplastic material equal to the linear velocity of said thermoplastic material in said parallel passageway at a point immediately prior to said die orifice.

6. A method as defined in claim 5 wherein the thermoplastic material is polyethylene.

References Cited
UNITED STATES PATENTS

| | | | |
|---|---|---|---|
| 2,061,042 | 11/1936 | Parkhurst | 18—12 |
| 2,541,201 | 2/1951 | Buecken et al. | 18—12 |
| 2,547,151 | 4/1951 | Braescke | 18—12 |
| 2,761,791 | 9/1956 | Russel | 264—176 |
| 2,810,159 | 10/1957 | Teichmann | 18—12 |
| 2,938,231 | 5/1960 | Lowey | 18—12 |
| 2,971,222 | 2/1961 | Weissman | 18—12 |
| 2,975,475 | 3/1961 | Heston | 18—12 |
| 3,008,187 | 11/1961 | Slade | 18—12 |
| 3,032,822 | 5/1962 | Maddock | 264—176 |
| 3,168,509 | 2/1965 | Juel | 264—176 |
| 3,212,134 | 10/1965 | Yokana | 264—176 |
| 3,226,766 | 2/1966 | Zelewsky et al. | 18—12 |
| 3,244,781 | 4/1966 | Covington et al. | 18—12 |
| 3,251,911 | 5/1966 | Hansen | 18—12 |

FOREIGN PATENTS 572,082 10/1959 Canada.

ALEXANDER H. BRODMERKEL, *Primary Examiner.*

DONALD J. ARNOLD, *Examiner.*

J. H. WOO, *Assistant Examiner.*